(No Model.)

G. T. HATCH & F. W. RIESENBERG.
REVERSING GEAR FOR ENGINES.

No. 287,023. Patented Oct. 23, 1883.

Witnesses:
H. W. Well,
Rich'd A. Goldsbrough

Inventors,
George T. Hatch,
Frank W. Riesenberg
per A. B. Upham,
Their Atty.

UNITED STATES PATENT OFFICE.

GEORGE T. HATCH AND FRANK W. RIESENBERG, OF PEORIA, ILLINOIS.

REVERSING-GEAR FOR ENGINES.

SPECIFICATION forming part of Letters Patent No. 287,023, dated October 23, 1883.

Application filed July 23, 1883. (No model.)

*To all whom it may concern:*

Be it known that we, GEORGE T. HATCH and FRANK W. RIESENBERG, of Peoria, in the county of Peoria, in the State of Illinois, have invented an Improved Reversing-Gear for Engines; and we do hereby declare that the following is a full, clear, and exact description thereof, reference being had to the annexed drawings, making a part of this specification, in which like letters of reference refer to like parts, and in which—

Figure 1:
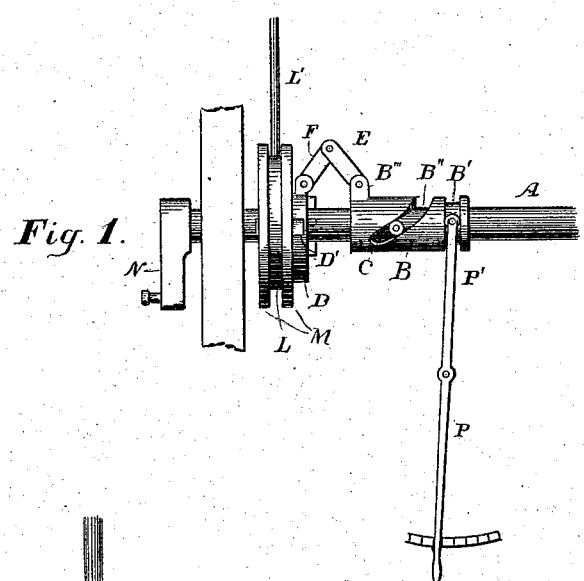
Figure 2:
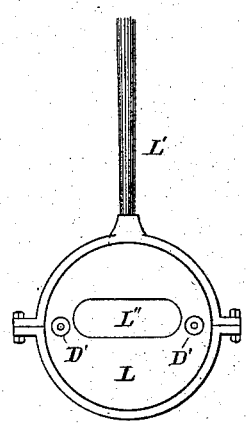
Figure 3:
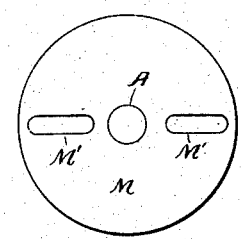
Figure 4:
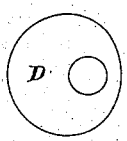

Figure 1 represents a plan view of the invention; Figs. 2, 3, and 4, details of the same.

The object of this invention is the construction of a reversing-gear for steam, gas, or hydraulic engines of that kind in which a slide-valve is used, whereby only one eccentric is used to move the slide-valve.

Our invention consists of simple and efficient means whereby the valve-moving eccentric of an engine can be changed from one side of the driving-shaft to the other, and thereby reverse the direction of the said driving-shaft's revolution.

In the drawings, A is the driving-shaft; L, the eccentric; L', the strap-rod connecting said eccentric to the slide-valve of the engine. The eccentric L is transversely movable on the shaft A by having said shaft pass through the slot L'', whose length is equal to double the eccentricity of the said eccentric. To give the slide-valve suitable lead, whether the eccentric L is causing the engine to go forward or backward, or is giving a diminished movement to the slide-valve to slow it up, we make the center of the slot L'' at a distance from the geometrical center of the eccentric equal to the lap of the valve. The disks M M, rigidly fastened upon the shaft A, retain the eccentric L secure from lateral movement. Through the slots M' M' in the disks M project from the eccentric L the friction-wheels D'. On the side of said eccentric L opposite to the crank-arm O there are two wheels, D', on each pin, instead of one. Between the outer pair of wheels, D', an oval eccentric, D, can rotate, and by its motion move the eccentric L transversely upon the shaft A. A reciprocating partial rotation of said oval eccentric D gives the same change of position to the said eccentric L. To give such a motion to the oval eccentric D, it is connected by the toggle-joint E F to the sleeve B, movable longitudinally upon the shaft A. Said sleeve B is thus moved by means of a lever, P, whose end P' is bifurcated and supplied with friction-wheels to fit in the annular groove B'. The spiral slot B'' in the sleeve B and the pin or friction wheel C, secured to the shaft A, change the longitudinal motion of the said sleeve to a spiral movement. This spiral motion gives a rotary motion to the oval eccentric D by means of the toggle-joint E F, which allows the approach and retreat of the collar B, but whose joints are firm enough to resist lateral force.

To cause the eccentric D to fit in between the friction-wheels D' D' throughout an entire revolution of itself, it must be made of such an oval form that every line drawn through its center of revolution shall be all approximately of the same length and equal to the distance between said wheels.

It is necessary to furnish the lever P with means for retaining it at the different positions which are required to give the desired changes to the eccentric L; but the maximum of resistance to said eccentric is taken by the friction-wheels D', resting against the ends of the slots M' M'.

What we claim as our invention, and for which we desire Letters Patent, is as follows, to wit:

1. In a steam, gas, or hydraulic engine, a non-centrally slotted eccentric having suitable connections to the slide-valve of the engine, in combination with laterally-confining disks and friction-wheels projecting through slots therein from said eccentric, an oval eccentric abutting between said friction-wheels, and means whereby longitudinal motion of a sleeve upon the shaft carrying the mechanism aforesaid shall reciprocate rotatively said oval eccentric, for the purpose set forth.

2. The shaft A of an engine, the eccentric L, having slot L'' and friction-wheels D', the disks M M, having slots M' M', and the eccentric L, in combination with the sleeve B, having spiral slot B'', friction-wheel C, and means whereby the rotary movement alone of the said sleeve B shall be transmitted to the said eccentric D, substantially as and for the purpose specified.

3. The shaft A of an engine, in combination with the eccentric L, having slot L″ and friction-wheels D′, strap-rod L′, disks M M, having slots M′ M′, the toggle-joint E F, sleeve B, having spiral slot B″ and annular groove B′, friction-wheel C and lever P, substantially as and for the purpose set forth.

In testimony that we claim the foregoing invention we have hereunto set our hands this 20th day of July, 1883.

GEO. T. HATCH.
  FRANK W. RIESENBERG.

Witnesses:
 H. W. WELLS,
 E. W. QUINCY.